United States Patent [19]

Carpenter et al.

[11] 3,861,262
[45] Jan. 21, 1975

[54] MANUALLY OPERATED CUT-OFF TOOL

[75] Inventors: Louis M. Carpenter; Kenneth L. Dunn, both of Fayetteville, N.Y.

[73] Assignee: Carpenter Manufacturing Co., Inc., Manlius, N.Y.

[22] Filed: Aug. 23, 1973

[21] Appl. No.: 390,903

[52] U.S. Cl. ........................ 83/642, 83/646, 83/523
[51] Int. Cl. ........................ B23d 17/00, B26d 1/30
[58] Field of Search ........ 30/181, 124, 357; 83/642, 83/643, 588, 523, 646.

[56] References Cited
UNITED STATES PATENTS

| | | | |
|---|---|---|---|
| 45,219 | 11/1864 | Blood | 83/642 X |
| 286,607 | 10/1883 | Hanchett | 83/643 |
| 310,431 | 1/1885 | Hoppes | 83/642 X |
| 3,292,478 | 12/1966 | Falk | 30/357 X |

FOREIGN PATENTS OR APPLICATIONS

| | | | |
|---|---|---|---|
| 118,474 | 3/1901 | Germany | 83/642 |

Primary Examiner—Al Lawrence Smith
Assistant Examiner—J. C. Peters
Attorney, Agent, or Firm—Charles S. McGuire

[57] ABSTRACT

A cut-off tool having a stationary base and single, movable blade intended especially for use in cutting predetermined lengths of flat ribbon-type insulated wires. A manually movable handle is mounted for rotation about a fixed axis and is pivotally attached at a single point to the blade support, thereby making the blade self-leveling with respect to the workpiece. The path of movement of the blade edge through the workpiece is arcuate, about the fixed pivot, and the planar support extends in both directions from the cutting plane. This structure provides a clean cut with no burr ends or distortion of the position of the conductors with respect to the insulation. The portion of the support which is contacted by the blade edge after passing through the workpiece may be positioned to present any of eight different areas for blade contact, thus extending the useful life thereof.

11 Claims, 9 Drawing Figures

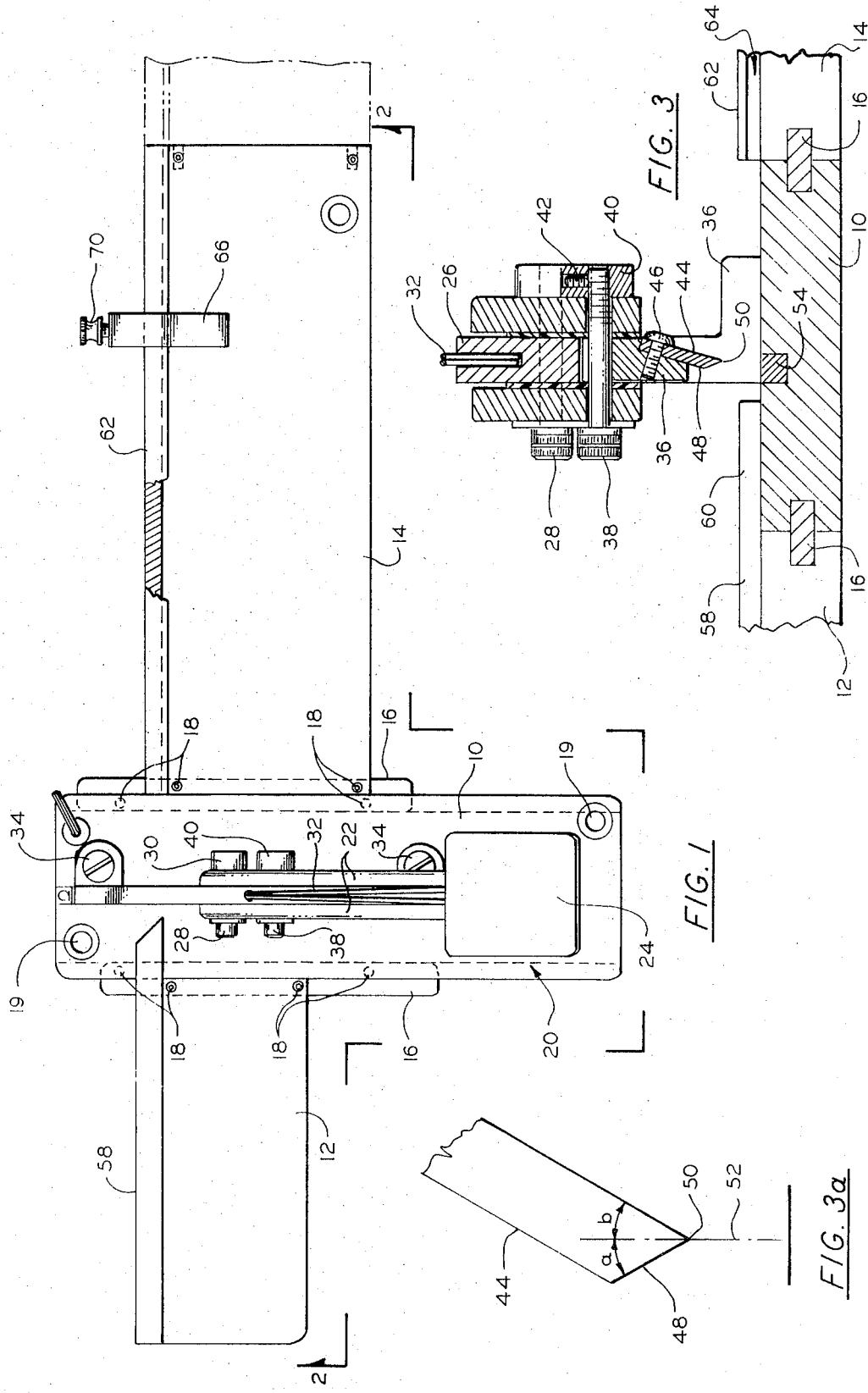

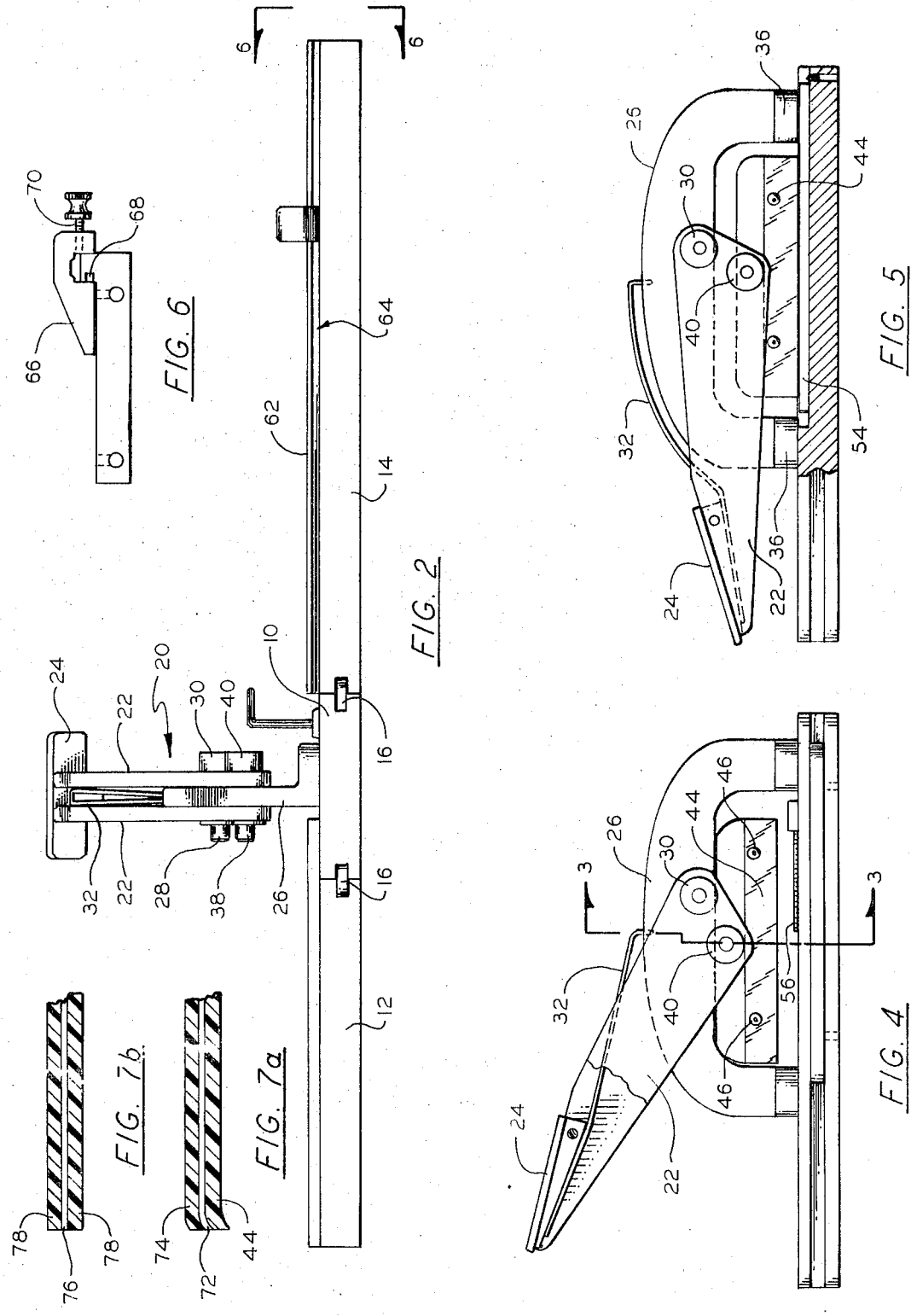

3,861,262

MANUALLY OPERATED CUT-OFF TOOL

BACKGROUND OF THE INVENTION

The present invention relates to cutting tools and, more particularly, to manually operable, movable blade, fixed support, bench-type tools.

The invention is designed especially for cutting flat objects by means of a movable cutting edge essentially parallel to a fixed support underlying the workpiece. The particular objects which the tool is intended to cut are multi-strand insulated wires of the type wherein the wires are arranged side-by-side and each covered by a continuous layer of insulating material, such as polyvinyl chloride, in the form of a flat ribbon. When cutting successive lengths from an essentially continuous strip of the ribbon, it is desirable that the cutting blade be moved through the workpiece with the blade edge parallel to the underlying, stationary support, and the blade angle equal on each side of the plane of movement of the blade edge. In order to assure a uniform and clean cut each time the blade is moved through the workpiece, the tool must normally include stucture for supporting and moving the blade in a manner which maintains parallelism of the edge with the underlying support surface.

Prior art structures have, in general, relied upon some form of blade guides to insure movement in the desired orientation. Such guides, or corresponding mechanism, add to the complexity and cost of the tool.

Prior art cutters commonly used for cutting selected lengths of flat ribbon type insulated cables also tend to create burrs and/or distort the ends of the individual conductors.

It is a principal object to the present invention to provide a novel and improved cutting tool having a blade movable through a workpiece on a fixed support surface without the necessity of blade guides, yet provides clean and repeatable cuts, conforming to the plane of the workpiece.

A further object is to provide a cutting tool having a single blade movable through a workpiece on a fixed support wherein means are included to extend the life of the support and to utilize a blade having a bevel on only one side of the cutting edge but which enters the workpiece with a plane normal to the workpiece bisecting the angle of the cutting edge.

Another object is to provide a cutting tool for severing flat ribbon type, multiple strand, insulated cables without leaving burrs on the ends of the individual conductors or distorting the position of the conductors within the insulation at the point of the cut.

In a more general sense, the object is to provide an improved, single blade cut-off tool for flat ribbon-type electrical cables.

Other objects will in part be obvious and will in part appear hereinafter.

SUMMARY OF THE INVENTION

In accordance with the foregoing objects, the invention incorporates a single cutting blade fixedly attached to a blade support. The latter is freely pivotable about an attachment substantially at its longitudinal center, and the center of the blade, to a handle. A support for the handle is fixedly secured to a base, the handle being mounted on the support for rotation about a fixed axis parallel to the pivotal axis of the blade support.

The base includes selectively adjustable stop means for positioning the workpiece both laterally and longitudinally. The portion of the base which is contacted by the blade cutting edge after passing through the workpiece is square in cross section and is contacted by the edge along a line spaced from said parallel to the centerline. The contact portion is retained in a recess in the base and may be rotated to position any one of the four sides for contact by the blade edge, and may be reversed end-for-end to position a different part of the same surface for contact by the cutting edge.

The blade support is constructed to permit use of a conventional cutting blade having a bevel or angle on only one side of the cutting edge, the other side of the blade being flat. The support and attachment means are so constructed and arranged that a plane normal to the base passing through the cutting edge bisects the angle thereof.

BRIEF DESCRIPTION OF THE FIGURES

FIG. 1 is a top plan view of the preferred embodiment of the invention;

FIG. 2 is a rear elevational view of the apparatus of FIG. 1, as seen from the line 2—2 thereof;

FIG. 3 is a fragmentary, elevational view in section on the line 3—3 of FIG. 4;

FIG. 3a is an enlarged, fragmentary detail of a portion of FIG. 3;

FIGS. 4 and 5 are side elevational views of the apparatus, FIG. 5 showing the base portion in section, with the movable elements in two different positions;

FIG. 6 is an end elevation of the base portion only, as seen from the line 6—6 of FIG. 2; and FIGS. 7a and 7b are enlarged, fragmentary, side elevational views, in vertical section, of workpieces as typically cut by the devices of the prior art and the present invention, respectively.

DETAILED DESCRIPTION

The preferred embodiment of the cut-off apparatus includes central base portion 10 having side base portions 12 and 14 extending from opposite sides thereof. Each of base portions 10, 12 and 14 comprises a separate piece, preferably of cast metal, adjustably secured together by rail members 16 extending into grooves in adjacent base portions. The position of each side base portion relative to the central base portion along the rail members, and that of the rail members themselves, may be fixed by tightening set screws 18. Both the upper and lower surfaces of the three base portions 10, 12 and 14 are coplanar. Bolt openings 19 are provided in central base portion 10 to secure the apparatus to an underlying support, if desired.

Handle 20 is formed in three pieces, comprising spaced side members 22 and manually engageable portion 24 secured thereto. Handle 20 is pivotally mounted on fixed support 26 by means of bolt 28 which passes through openings in both of side members 22 and support 26, and is retained by cylindrical nut 30. Spring 32 is affixed at one end to support 26, the other end being retained under manually engageable portion 24 to bias handle 20 toward rotation about its pivotal mounting in a clockwise direction as seen from the side pictured in FIGS. 4 and 5. Support 26 is secured to central base portion 10 by screws 34 (FIG. 1) which pass through openings in ears 36 on the handle support.

Blade support 36 is pivotally attached by bolt 38 to handle 20. The opening in blade support 36 is sufficiently larger than the diameter of bolt 38 that the support is freely rotatable without significant frictional constraint. Bolt 38 is secured by cylindrical nut 40 which is provided with a threaded opening for set screw 42 to prevent relative rotation of the bolt and nut. Nut 30 may, of course, be provided with a similar set screw to prevent its rotation relative to bolt 28.

Knife 44 is secured to blade support 36 by screws 46. It will be noted in FIG. 3 that blade 44 is flat on one side and is beveled on the other side, as indicated at 48, to form cutting edge 50. Blades suitable for use in the applications contemplated by the present invention are commonly available in such configuration. When blade 44 is affixed to support 36 with the beveled side of the blade facing the surface of support 36 which is provided with the tapped openings for screws 46, a plane normal to the support surface below the blade bisects the cutting edge angle. This is illustrated in FIG. 3a wherein the plane is indicated by dotted line 52. Angle a between plane 52 and beveled surface 48 is equal to angle b between plane 52 and the flat side of blade 44.

Central base portion 10 is provided with a recess extending parallel to edge 50 and square in cross section. Of substantially the same, or slightly smaller cross sectional dimensions as the recess in base portion 10 is knife contact block 54. Since bolts 28 and 38, defining the axes of rotation of handle 20 and blade support 36, respectively, are both horizontally disposed, translational movement of the blade support, and hence of blade 44, will be in a vertical plane. The recess in base portion 10 is so positioned relative to cutting edge 50 that block 54, positioned in the recess, will be contacted by the edge along a line parallel and spaced to one side of the centerline of the block. By removing block 54 from the recess and reversing it end-for-end, the same surface of the block will be positioned for contact by edge 50 along a line on the opposite side of the centerline. Thus, block 54 may be selectively positioned for contact of two different portions of each of its four surfaces by cutting edge 50, thereby extending the useful life of the contact block. As seen in FIGS. 3 and 5, one end of handle support 26 is positioned over a portion of block 54 to retain the latter securely in the recess in base portion 10.

Workpiece 56 (FIG. 4) is a flat ribbon-type electrical cable comprising a plurality of conducting wires arranged in side-by-side relation and completely enclosed by an insulating material. It is desirable when trimming ends or cutting desired lengths of such cables that knife edge contact the upper surface uniformly along its width and pass cleanly therethrough with a shearing motion, i.e., movement along a diagonal path. Since blade support 36 is freely rotatably about its pivot axis on bolt 38, the blade will level itself on the upper surface of the workpiece as manually engageable portion 24 of handle 20 is depressed to lower the blade.

The path of movement of edge 50 is defined by the relative positions of the pivotal mountings of the handle and blade support. These are preferably spaced rather closely, since the vertical distance of blade travel is not great in the disclosed embodiment. Preferably, the pivotal axes of the handle and blade support, defined by the centers of bolts 28 and 38, are spaced by not more than twice the vertical distance of blade travel.

Both lateral and longitudinal positioning means or stops are provided for defining the position of workpiece 56 with respect to blade 44. Side base portion 12 is provided with rail 58 extending upwardly from the forward edge thereof. An edge of workpiece 56 is placed in contact with rail 58, which is arranged at a right angle to the plane of travel of cutting edge 50, thereby assuring a square cut of the workpiece. End portion 60 of rail 58 extends partially over central base portion 10 to a position adjacent the cutting edge plane to allow lateral positioning of short workpieces, and to provide lateral support for the workpiece closely adjacent the cutting edge of the knife blade.

Side base portion 14 is provided with rail 62, having an undercut indicated by reference numeral 64. Selectively positionable longitudinal stop 66 includes lip 68 (FIG. 6) for engagement in undercut 64 and set screw 70 for engagement with the outside of rail 62. With set screw 70 loosened, stop 66 may be moved to any desired position along rail 62 and the set screw then tightened to fix the position of the stop. The distance from the plane of cutting edge 50 to stop 66 will define the length of pieces cut from workpiece 56, the latter being positioned with its end against stop 66. Suitable calibrations (not shown) may be provided on rail 62 for indicating the length of pieces cut with stop 66 in any position.

Typical cuts resulting from the use of more common prior art devices often produce a burr edge on the individual conductors.

As indicated in FIG. 7a, the exposed end 72 of the conductor is thus distorted as it tends to be bent downwardly at the point of the cut. Insulation 74 may also be distorted in the same manner. The cutting tool of the present invention, on the other hand, produces a clean cut without distortion of conductor 76 or insulation 78, as shown in FIG. 7b.

Thus, there has been disclosed a cut-off tool which is simple and durable in construction and which is easily and rapidly manually actuable to provide clean, accurate cuts. The tool is especially suited for making repeated cuts of flat ribbon-type electrical cables, the mounting and movement means for the blade being such that the blade is, in effect, self-leveling with respect to the workpiece.

The physical diminsions and relationship of the elements is such that the handle is rotated through substantially less than 90° in moving between its two limits. The arcuate path of the cutting edge is near the lower side of the circle of rotation when the edge contacts the upper surface of the base. That is, there is a substantial forward movement of the blade through the workpiece, as well as vertical movement.

What is claimed is:

1. A manually operated cutting tool comprising, in combination:
   a. a stationary base having substantially planar upper surface for supporting a workpiece;
   b. a fixed support having a portion positioned in spaced relation to said upper surface;
   c. a handle selectively rotatable about a fixed axis through said portion of said support;
   d. a knife blade having a cutting edge disposed for movement into and away from contact with said upper surface; and
   e. means supporting said knife blade for free rotation about a second axis through said handle parallel to said fixed axis and spaced therefrom by a distance such that rotation of said handle about said fixed axis in a first direction moves said cutting edge in an arcuate path into contact with said upper surface.

2. The invention according to claim 1 wherein said second axis is located substantially at the longitudinal center of said cutting edge.

3. The invention according to claim 2 wherein said second axis passes through a supporting element to which said knife blade is fixedly attached.

4. The invention according to claim 3 wherein said knife blade is formed with two planar, parallel sides and said cutting edge is formed at the terminus of one side of said knife blade, the parallel side being connected to said one side at said cutting edge by a bevel surface, and said supporting element is so constructed and arranged that the vertical angle between a plane normal to said upper surface and passing through said cutting edge and said one side is equal to the angle between said plane and said bevel surface.

5. The invention according to claim 1 wherein said handle is biased toward rotation about said fixed axis in the direction opposite to said first direction.

6. The invention according to claim 5 wherein said rotation of said handle in said opposite direction is limited by contact with said portion of said fixed support of an element to which said knife blade is fixedly attached.

7. The invention according to claim 1 wherein said second axis is so spaced from said fixed axis, and said knife blade and upper surface are so arranged, that a line through said fixed and second axes forms an acute angle with a vertical line through said fixed axis when said cutting edge is in contact with said upper surface.

8. The invention according to claim 7 wherein a fixed stop is provided for limiting rotation of said handle in a direction opposite to said first direction, and said handle is rotated through an angle of less than 90° in moving between its limits in each direction.

9. The invention according to claim 1 wherein said base comprises a major portion having a recess in the upper surface thereof, and an elongated contact portion having a cross section corresponding to that of said recess, whereby one surface of said contact portion is flush with said upper surface and comprises a portion thereof, said contact portion being disposed for contact by said cutting edge upon movement of said knife blade into contact with said upper surface.

10. The invention according to claim 9 wherein said recess and said contact portion are square in cross section, whereby any of the four sides of said contact portion may be selectively disposed for contact by said cutting edge, and said contact portion is disposed for contact by said cutting edge along a line substantially parallel to and spaced to one side of the longitudinal centerline of said contact portion, whereby the latter may be reversed end-for-end in said recess to dispose a different portion of the same surface for contact by said cutting edge.

11. The invention according to claim 1 wherein said upper surface extends an appreciable distance in both directions from a vertical plane through said cutting edge and both lateral and longitudinal stops are provided in association with said base for fixing the position of the workpiece.

* * * * *